United States Patent
Yoshikawa et al.

[11] Patent Number: 6,023,125
[45] Date of Patent: Feb. 8, 2000

[54] ELECTRON EMISSION DEVICE AND DISPLAY USING THE SAME

[75] Inventors: Takamasa Yoshikawa; Kiyohide Ogasawara; Hiroshi Ito, all of Tsurugashima, Japan

[73] Assignee: Pioneer Electronic Corporation, Tokyo, Japan

[21] Appl. No.: 09/036,747

[22] Filed: Mar. 9, 1998

[30] Foreign Application Priority Data

Mar. 10, 1997 [JP] Japan .................................... 9-118687
Jun. 12, 1997 [JP] Japan .................................... 9-171001

[51] Int. Cl.⁷ .............................. H01L 33/00; H01J 1/30
[52] U.S. Cl. ..................... 313/310; 313/309; 313/495; 313/497
[58] Field of Search ..................... 313/309, 310, 313/336, 351, 495, 496, 497, 422, 512

[56] References Cited

U.S. PATENT DOCUMENTS 5,760,538  6/1998  Mitsutake et al. ................... 313/422
5,838,097  11/1998  Kasanuke et al. .................... 313/495

FOREIGN PATENT DOCUMENTS 0 798 761 A1  10/1997  European Pat. Off. .
07065710  3/1995  Japan .

OTHER PUBLICATIONS

"Flat Display Based on the Metal–Insulator–Metal Emitter Array" Journal of Vacuum Science and Technology: Part B, vol. 11, No. 2, Mar., 1993, Troyan et al., pp. 514–517.

"A Hot Electron, Cold Cathode, Emitter", Verderber et al., The Radio and Electronic Engineer, vol. 33, Jun. 1967, pp. 347–351.

European Search Report.

*Primary Examiner*—Ashok Patel
*Attorney, Agent, or Firm*—Perman & Green, LLP

[57] ABSTRACT

An electron emission device exhibits a high electron emission efficiency. The device comprises an electron supply layer of metal or semiconductor, an insulator layer formed on the electron supply layer, and a thin-film metal electrode formed on the insulator layer. The electron emission device emits electrons when an electric field is applied between the electron supply layer and the thin-film metal electrode. The insulator layer is a dielectric layer having a thickness of 50 nanometers or more, and formed by a vacuum evaporation process with a layer forming rate of 0.5 to 100 nanometers/minute.

2 Claims, 5 Drawing Sheets

ENERGY BAND

ELECTRON EMISSION DEVICE AND DISPLAY USING THE SAME

BACKGROUND OF THE INVENTION

1. Field of the Invention

The present invention relates to an electron emission device and an electron emission display using the same.

2. Description of Related Art

Among field electron emission display apparatuses, FED (Field Emission Display) is known as a planar emission display equipped with an array of cold-cathode electron emission source which does not require cathode heating.

The emission principle of, for example, an FED using a spindt type cold cathode is as follows. Although this FED has a cathode array different from that of a CRT, its emission principle is, like a CRT, that electrons are drawn into a vacuum space by means of a gate electrode spaced apart from the cathode, and the electrons are made to impinge upon the fluorescent substance that is coated on a transparent anode, thereby causing light emission.

This field emission source, however, faces a problem of low production yield because the manufacture of the minute spindt type cold cathode is complex and involves many steps.

There also exists an electron emission device with a metal-insulator-metal (MIM) structure as a planar electron source. This electron emission device with an MIM structure has an Al layer as a cathode, an $Al_2O_3$ insulator layer of about 10 nm in film thickness and an Au layer, as an anode, of about 10 nm in film thickness formed in order on the substrate. With this device placed under the opposing electrode in vacuum, when a voltage is applied between the underlying Al layer and the overlying Au layer and an acceleration voltage is applied to the opposing electrode, some of electrons leap out of the overlying Au layer and reach the opposing electrode. Even the electron emission device with an MIM structure does not yet provide a sufficient amount of emitted electrons.

To improve this property, it is considered that the $Al_2O_3$ insulator layer need to be made thinner by about several nanometers, and the quality of the membranous $Al_2O_3$ insulator layer and the interface between the $Al_2O_3$ insulator layer and the overlying Au layer should be made more uniform.

To provide a thinner and more uniform insulator layer, for example, an attempt has been made to control the formation current by using anodization to thereby improve the electron emission characteristic, as in the invention described in Japanese Patent Kokai No. Hei7-65710.

However, even an electron emission device with an MIM structure which is manufactured by this method ensures an emission current of about $1 \times 10^{-5}$ $A/cm^2$ and an electron emission efficiency of about $1 \times 10^{-3}$.

OBJECTS AND SUMMARY OF THE INVENTION

It is therefore an object of the present invention to provide an electron emission device with a high electron emission efficiency and an electron emission display apparatus using the same.

An electron emission device according to this invention comprises: an electron supply layer of metal or semiconductor; an insulator layer formed on said electron supply layer; and a thin-film metal electrode formed on said insulator layer, said electron emission device emitting electrons when an electric field is applied between said electron supply layer and said thin-film metal electrode, wherein said insulator layer is a dielectric layer having a thickness of 50 nanometers or more, and formed by a vacuum evaporation process with a layer forming rate of 0.5 to 100 nanometers/minute.

According to the electron emission device of this invention with the above structure, through holes are not likely to be produced in the insulator layer because of its large thickness, and the production yield is improved consequently. The emission current of the electron emission device is approximately $1 \times 10^{-3}$ $A/cm^2$, and the electron emission current ratio of $1 \times 10^{-1}$ is obtained. This electron emission device, when in use in a display, can provide high luminance, can suppress the consumption of the drive current and the generation of heat from the device, and can reduce a load on the driving circuit.

The electron emission device of this invention is a planar or spot-like electron emission diode, and can serve as a light-emitting diode or a laser diode which emits electromagnetic waves of infrared rays, visible light or ultraviolet rays.

An electron emission display according to the present invention comprises: first and second substrates facing each other with a vacuum space in between; a plurality of electron emission devices provided on said first substrate; a collector electrode provided in said second substrate; and a fluorescent layer formed on said collector electrode, wherein each of said electron emission devices comprises an electron supply layer of metal or semiconductor formed on said first substrate, an insulator layer formed on said electron supply layer, and a thin-film metal electrode formed on said insulator layer, and said insulator layer is a dielectric layer having a thickness of 50 nanometers or more, and formed by a vacuum evaporation process with a layer forming rate of 0.5 to 100 nanometers/minute.

DETAILED DESCRIPTION OF THE PREFERRED EMBODIMENTS

Preferred embodiments of the present invention will now be described with reference to the accompanying drawings.

Figure 1:
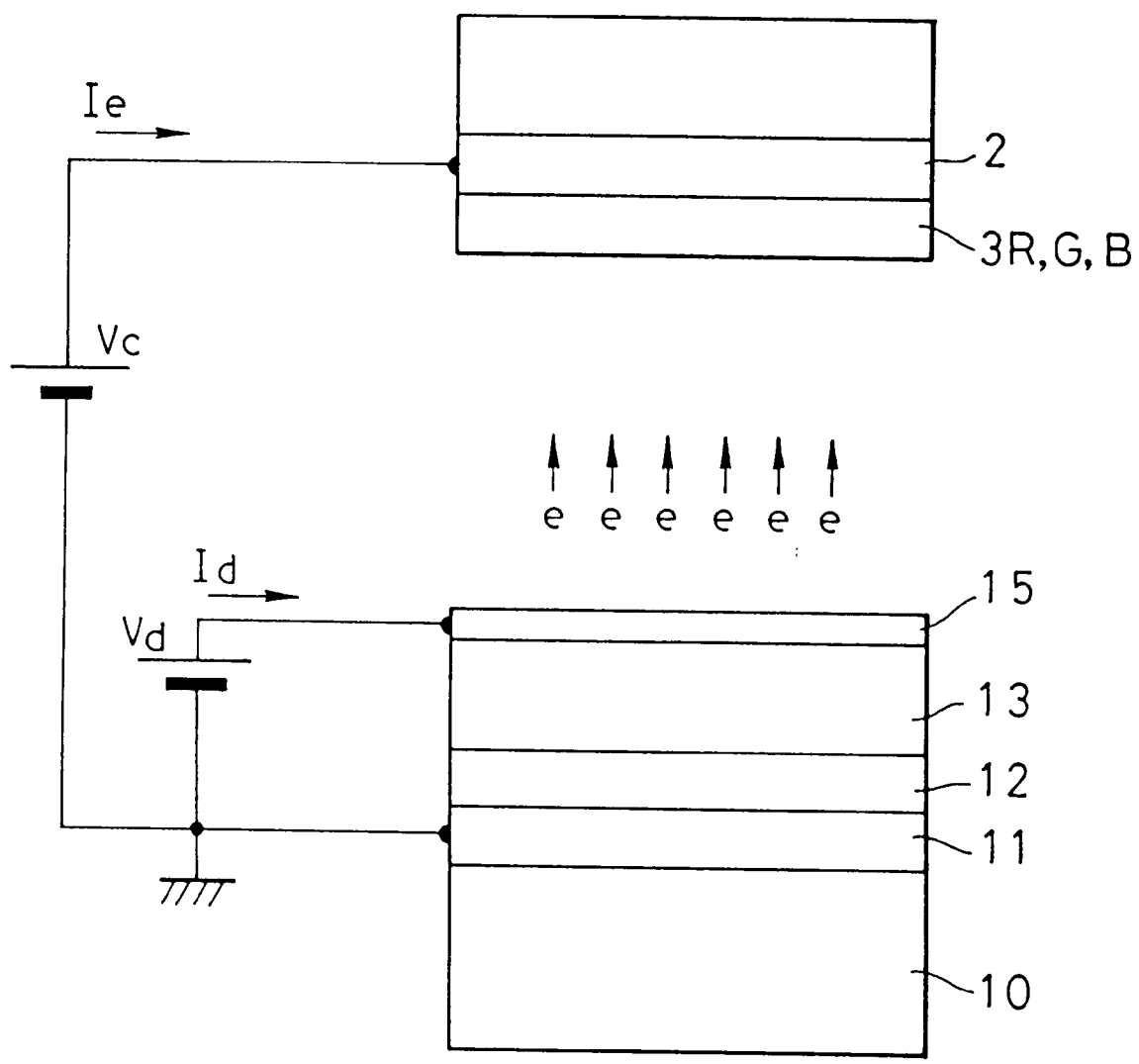
FIG. 1 is a schematic cross-sectional view of an electron emission device according to this invention.

As shown in FIG. 1, an electron emission device embodying this invention includes a substrate 10 having an ohmic electrode 11 thereon, and further includes an electron supply layer 12 of metal or semiconductor, an insulator layer 13, and a thin-film metal electrode 15 facing a vacuum space, which are formed on the substrate 10 in the described order. With this electron emission device, electrons are emitted by the application of an electric field between the electron supply layer 12 and the thin-film metal electrode 15.

The insulator layer 13 is made of a dielectric substance and has a very large film thickness of 50 nm or greater. The electron emission device can be regarded as a diode of which the thin-film metal electrode 15 at its surface is connected to a positive potential Vd and the back, and the ohmic electrode 11 is connected to a ground potential. When the voltage Vd is applied between the ohmic electrode 11 and the thin-film metal electrode 15 to supply electrons into the electron supply layer 12, a diode current Id flows. Since the insulator layer 13 has a high resistance, most of the applied electric field is applied to the insulator layer 13. The electrons move inside the insulator layer 13 toward the thin-film metal electrode 15. Some of the electrons that reach near the thin-film metal electrode 15 tunnel through the thin-film metal electrode 15, due to the strong field, to be discharged out into the vacuum space.

The electrons e (emission current Ie) discharged from the thin-film metal electrode 15 by the tunnel effect are accelerated by a high voltage Vc, which is applied to an opposing collector electrode (transparent electrode) 2, and are collected at the collector electrode 2. If the collector electrode 2 is coated with a fluorescent substance, corresponding visible light is emitted.

While Si is particularly effective as a material for the electron supply layer of the electron emission device, a simple semiconductor or a compound semiconductor of an element of a group IV, a group III-V, a group II-VI or the like, such as a germanium (Ge), silicon carbide (SiC), gallium arsenide (GaAs), indium phosphide (InP), or cadmium selenide (CdSe) can be used as well.

While metals like Al, Au, Ag and Cu are effective as the material of the electron supply layer, Sc, Ti, Cr, Mn, Fe, Co, Ni, Zn, Ga, Y, Zr, Nb, Mo, Tc, Ru, Rh, Pd, Cd, Ln, Sn, Ta, W, Re, Os, Ir, Pt, Tl, Pb, La, Ce, Pr, Nd, Pm, Sm, Eu, Gd, Tb, Dy, Ho, Er, Tm, Yb, Lu and the like can be used as well.

Silicon oxide $SiO_x$ (wherein x represents an atomic ratio) is effective as the dielectric material of the insulator layer. Furthermore, a metal oxide or a metal nitride such as $LiO_x$, $LiN_x$, $Na_0x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $NbN_x$, $TaO_x$, $TaN_x$, $CrO_x$, $CrN_x$, $MoO_x$, $WoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $TiO_x$, $TiN_x$, $SiN_x$, $GeO_x$, $SnO_x$, $PbO_x$, $PO_x$, $PN_x$, $AsO_x$, $SbO_x$, $SeO_x$, $TeO_x$, a complex metal oxide such as $LiAlO_2$, $Li_2SiO_3$, $Li_2TiO_3$, $NaAl_{22}O_{34}$, $NaFeO_2$, $Na_4SiO_4$, $K_2SiO_3$, $K_2TiO_3$, $K_2WO_4$, $Rb_2CrO_4$, $CsCrO_4$, $MgAl_2O_4$, $MeFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}Y_3$, $Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $LU_3Fe_5O_{12}$, $NiTiO_3$, $Al_2TiO_3$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ca_5O_{12}$, $InFeO_3$, $MgIn_2O_4$, $Al_2TiO_5$, $FeTiO_3$, $MgTiO_3$, $Na_2SiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2Sb_2O_3$, $CuSeO_4$, $Na_2SeO_3$, $ZnSeO_3$, $K_2TeO_3$, $K_2TeO_4$, $Na_2TeO_3$, $Na_2TeO_4$, a sulphide such as FeS, $Al_2S_3$, MgS, ZnS, a fluoride such as LiF, $MgF_2$, $SmF_3$, chlorides such as HgCl, $FeCl_2$, $CrCl_3$, a bromide such as AgBr, CuBr, $MnBr_2$, an iodide such as $PbI_2$, CuI, $FeI_2$, or a metal oxide nitride such as SiAlON, are also effective.

As the dielectric material of the insulator layer 13, carbon such as diamond, Fulleren (C2n), or a metal carbide such as $Al_4C_3$, $B_4C$, $CaC_2$, $Cr_3C_2$, $Mo_2C$, MoC, NbC, SiC, TaC, TiC, VC, $W_2C$, WC, ZrC, are effective. Fulleren (C2n) has a basket shape spherical molecule represented by $C_{60}$ and formed by carbon atoms only. There exist molecule variations of $C_{32}$~$C_{960}$. In the above-described formulas, x in Ox and Nx represents an atomic ratio. The same applies to the following formulas also.

Although metals like Pt, Au, W, Ru and Ir are effective as the material for the thin-film metal electrode 15 on the electron emission side, Al, Sc, Ti, V, Cr, Mn, Fe, Co, Ni, Cu, Zn, Ga, Y, Zr, Nb, Mo, Tc, Rh, Pd, Ag, Cd, Ln, Sn, Ta, Re, Os, Tl, Pb, La, Ce, Pr, Nd, Pm, Sm, Eu, Gd, Tb, Dy, Ho, Er, Tm, Yb, Lu and the like can be used as well.

The material for the device substrate 10 may be ceramics such as $Al_2O_3$, $Si_3N_4$ or BN instead of glass.

Although vacuum evaporation is particularly effective as the method for forming those layers and the substrate, sputtering, CVD (Chemical Vapor Deposition), laser aberration method, and MBE (Molecular Beam Epitaxy) are also effective.

The electron emission device of this invention was fabricated and its characteristics were examined specifically.

The electron supply layer 12 of silicon (Si) was formed 5000 nm thick, by sputtering, on the electrode surface of the device substrate 10 of glass on which an Al ohmic electrode was formed 300 nm thick by sputtering. A plurality of Si substrates of this type were prepared.

Then, the $SiO_2$ insulator layer 13 was formed on the electron supply layers 12 of the Si substrate by vacuum deposition while changing the film thickness of the insulator layer 13 in a range from 0 nm to 500 nm, thus providing a plurality of $SiO_2$ insulator substrates. The $SiO_2$ insulator layer 13 was formed by vacuum deposition, under the pressure of less than $10^{-4}$ Torr, at the forming rate of 0.1 to 1000 nm/min, preferably 0.5 to 100 nm/min. By appropriately changing conditions such as the selection of evaporation source material, the distance between evaporation source and the substrate, the condition of layer formation, the heating condition of the substrate, and the additional use of oxygen ion beam assist, the control of the selection between single layer or multilayer structure, the selection between amorphous or crystal phase, the grain size and the atomic ratio of the insulator layer 13 can be effected.

The analysis on the $SiO_2$ insulator layer 13 in this embodiment by X-ray diffraction showed diffraction intensities Ic at crystal portions and a halo intensity Ia by the amorphous phase. It can be assumed from this that $SiO_2$ of the insulator layer has the amorphous phase.

Finally, the thin-film metal electrode 15 of Pt was formed 10 nm thick on the surface of the amorphous $SiO_2$ layer of each substrate, thus providing a plurality of device substrates.

Meanwhile, a transparent substrate which has the ITO collector electrode 2 formed inside the transparent glass substrate and a transparent substrate which has a fluorescent layer 3 of fluorescent substances corresponding to R, G and B formed on each collector electrode by the normal scheme, were prepared.

Electron emission devices were assembled by holding those device substrates and transparent substrates apart from one another by 10 mm in parallel by a spacer in such a way that the thin-film metal electrode 15 faced the collector electrode 2, with the clearance therebetween made to vacuum of $10^{-7}$ Torr or $10^{-5}$ Pa.

Then, the diode current Id and the emission current Ie corresponding to the thickness of the $SiO_2$ film of each of the acquired multiple devices were measured.

Figure 2:
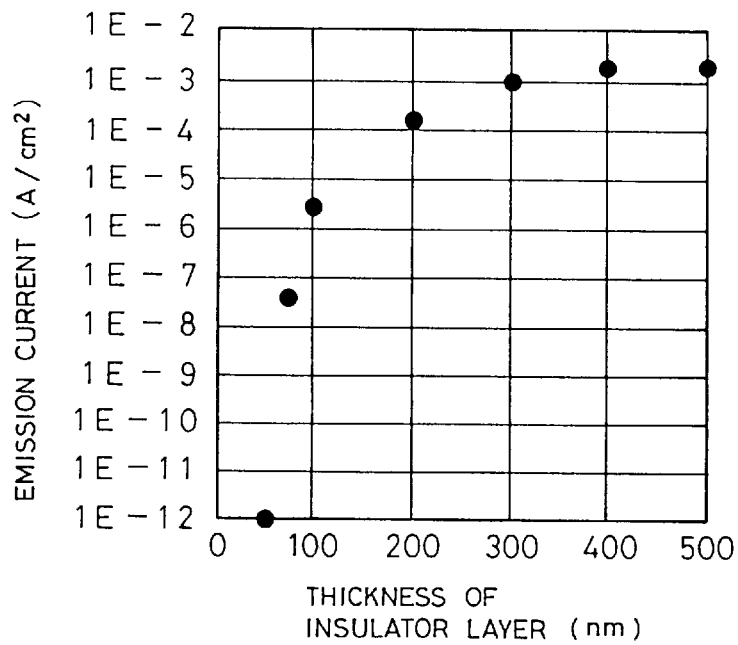
FIG. 2 is a graph showing the dependency of the electron emission current on the film thickness of an $SiO_2$ layer in the electron emission device embodying this invention.
Figure 3:
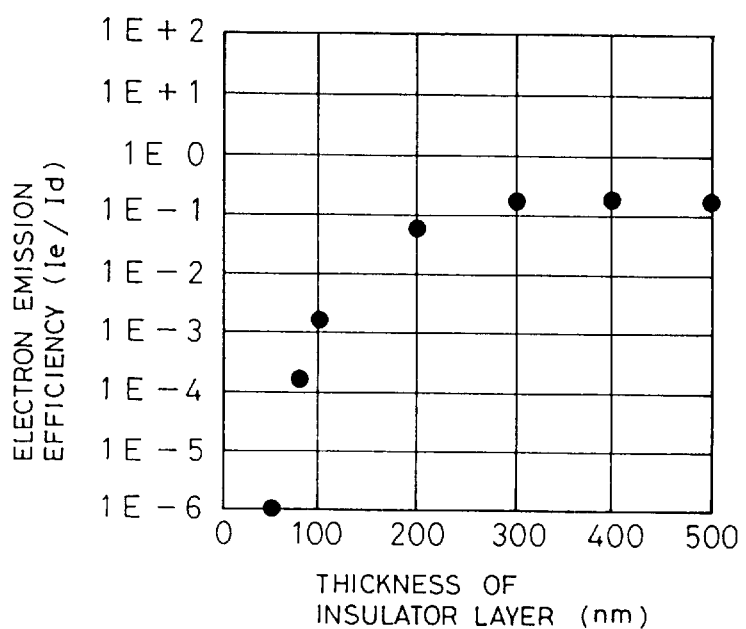
FIG. 3 is a graph showing the dependency of the electron emission efficiency on the film thickness of the $SiO_2$ layer in the electron emission device embodying this invention.

FIGS. 2 and 3 show the relationship between the film thickness of each $SiO_2$ layer and the maximum emission current Ie and the maximum electron emission efficiency (Ie/Id) for each film thickness when Vd of 0 to 200 V was applied to the prepared electron emission devices. As apparent from FIGS. 2 and 3, while the emission current and the electron emission efficiency were saturated from the thickness of 50 nm, the devices whose $SiO_2$ layers having the thicknesses of 300 to 500 nm showed the maximum emission current of about $1 \times 10^{-3}$ $A/cm^2$ and the maximum electron emission efficiency of about $1 \times 10^{-1}$.

It is understood from those results that by applying a voltage of 200 V or lower, the emission current of $1 \times 10^{-6}$ $A/cm^2$ or greater and the electron emission efficiency of $1 \times 10^{-3}$ or greater can be acquired from an electron emission device which has an $SiO_2$ dielectric layer 50 nm or greater in thickness, preferably 100 to 400 nm in thickness.

With a voltage of approximately 4 kV applied between the fluorescent-substance coated collector electrode 2 and the thin-film metal electrode 15, a uniform fluorescent pattern corresponding to the shape of the thin-film metal electrode was observed in the devices whose $SiO_2$ layers have the thickness of 50 nm or greater. This shows that the electron emission from the amorphous $SiO_2$ layer is uniform and has a high linearity, and that those devices can serve as an electron emission diode, or a light-emitting diode or laser diode which emits electromagnetic waves of infrared rays, visible light or ultraviolet rays.

Diode current Id and emission current Ie were measured for a plurality of electron emission devices whose insulator layers having the thickness of 400 nm were formed by the vacuum evaporation method under various conditions.

Figure 5:
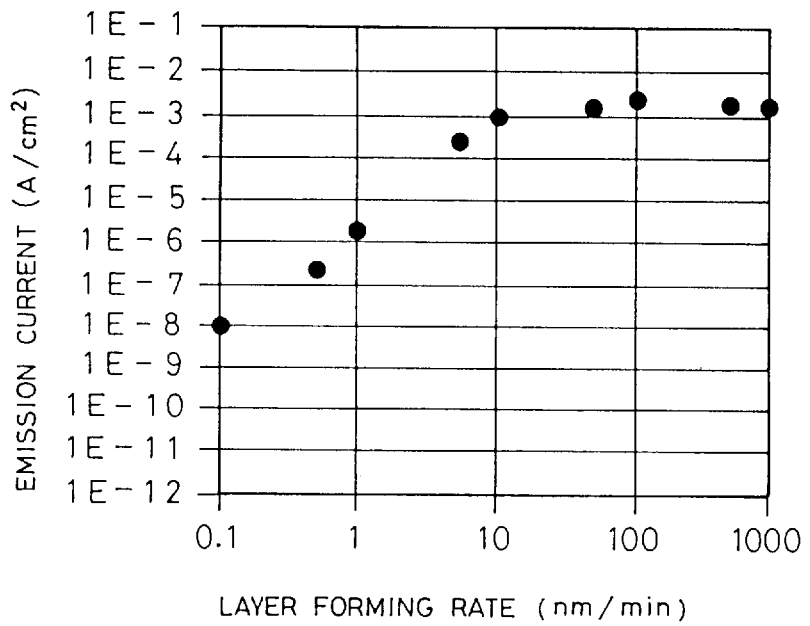
FIG. 5 is a graph illustrating the relationship between the electron emission current of the electron emission device according to this invention and the layer forming rate.
Figure 6:
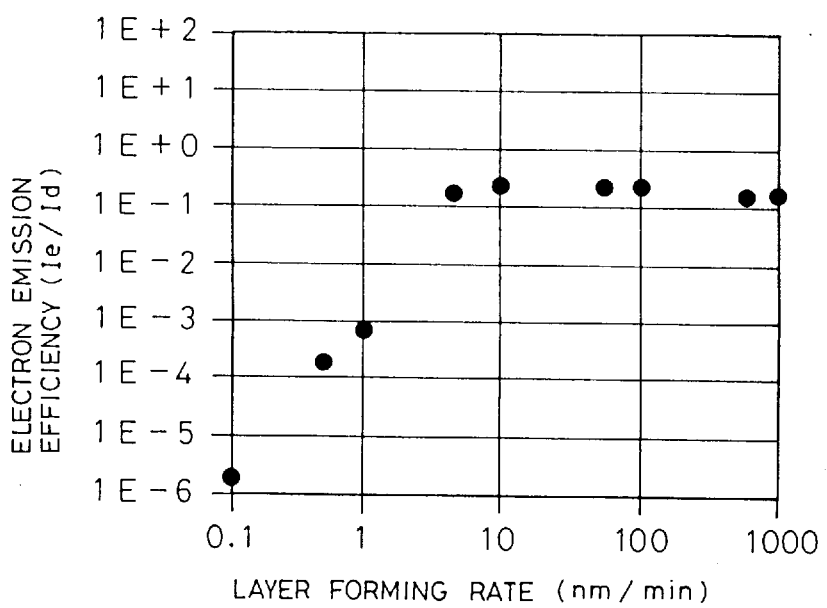
FIG. 6 is a graph depicting the relationship between the electron emission efficiency of the electron emission device according to this invention and the layer forming rate.

FIGS. 5 and 6 respectively show a relationship between the emission current Ie and the layer forming rate and a relationship between the electron emission efficiency (Ie/Id) and the layer forming rate. As a result of this measurements, it is determined that the electron emission current of $1 \times 10^{-6}$ $A/cm^2$ or higher, and the electron emission efficiency of $1 \times 10^{-3}$ or higher can be obtained with the layer forming rate of 1~1000 nm/min.

Figure 4:
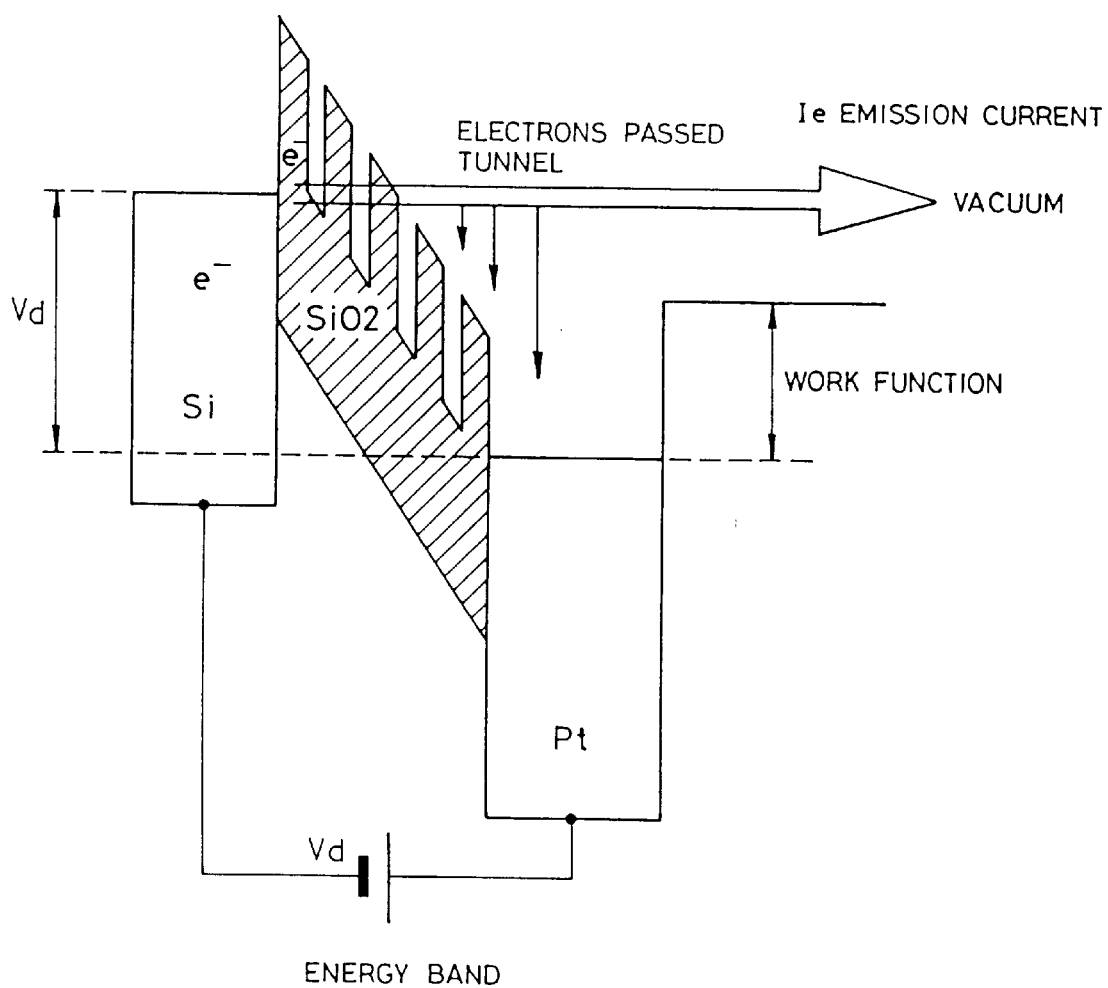
FIG. 4 is a diagram showing a band characteristic of the electron emission device according to the present invention.

As a result of the observation of the surface of the thus formed insulator layer by using an scanning electron microscope (SEM), it was determined that the insulator layer is formed by lumps of particles of about 20 nm in diameter. It is assumed the peculiar phenomenon that a tunnel current flows even though the thickness of the layer is 50 nm or more, is originated from this feature of large particles. FIG. 4 is an energy band diagram, which explains the phenomenon mentioned above. As depicted in this figure, although $SiO_2$ is inherently an insulator, a plurality of bands having low potentials exist due to crystal defect and impurity which tend to appear in the lump of particles and its vicinity. The electron tunnels successively through these bands of low potentials. As a result, it tunnels through the whole layer having the thickness of 50 nm or more.

Figure 7:
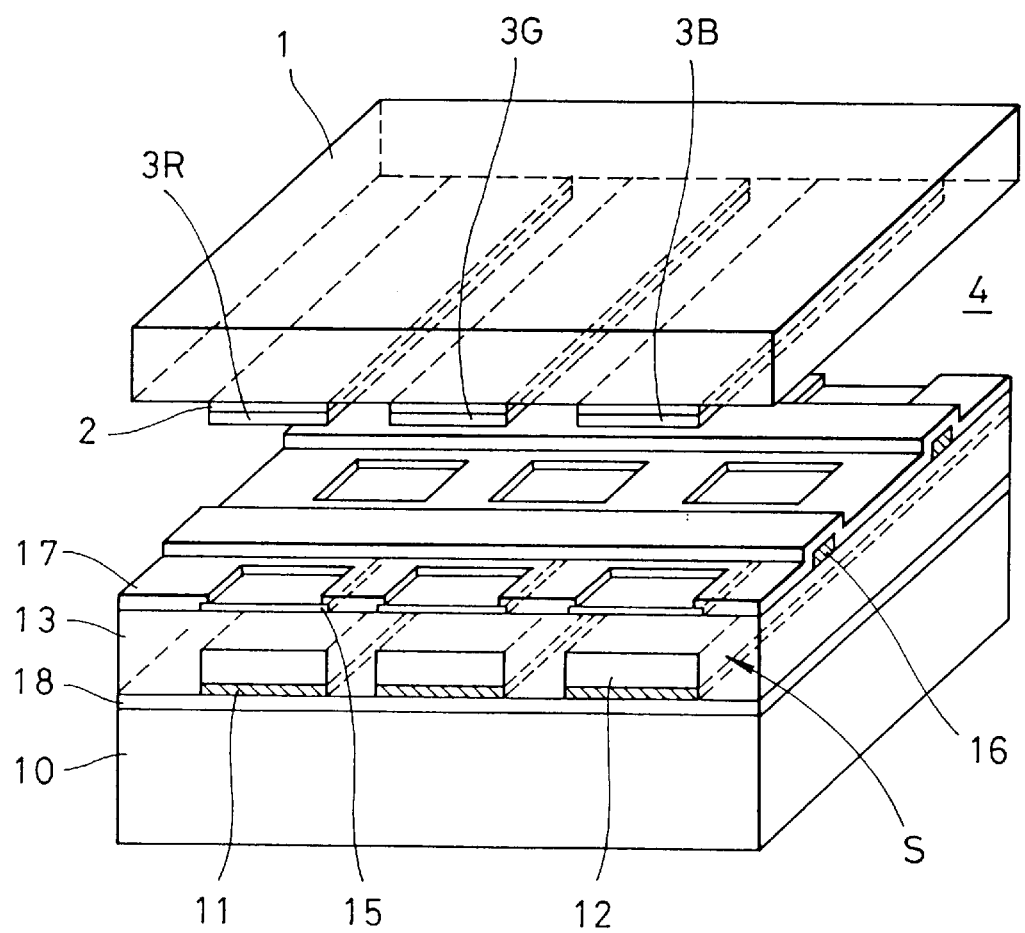
FIG. 7 is a schematic perspective view showing an electron emission display according to one embodiment of this invention.

FIG. 7 shows the embodiment of electron emission display device according to the present invention.

This embodiment of display device comprises a pair of the transparent substrate 1 and the device substrate 10, which face each other with vacuum space 4 in between. In the illustrated electron emission display apparatus, a plurality of transparent collector electrodes 2 of, for example, an indium tin oxide (so-called ITO), tin oxide (SnO), zinc oxide (ZnO) or the like, are formed in parallel on the inner surface of the transparent glass substrate 1 or the display surface (which faces the back substrate 10). The collector electrodes 2 may be formed integrally. The transparent collector electrodes which trap emitted electrons are arranged in groups of three in association with red (R), green (G) and blue (B) color signals in order to provide a color display panel, and voltages are applied to those three collector electrodes respectively. Therefore, fluorescent layers 3R, 3G and 3B of fluorescent substances corresponding to R, G and B are respectively formed on the three collector electrodes 2 in such a way as to face the vacuum space 4.

A plurality of ohmic electrodes 11 are formed in parallel on the inner surface of the device substrate 10 of glass or the like which faces the transparent glass substrate 1 with the vacuum space 4 in between (i.e., said inner surface faces the transparent glass substrate 1) via an insulator layer 18. The insulator layer 18 is comprised of an insulator like $SiO_2$, $SiN_x$, $Al_2O_3$ or AlN, and serves to prevent an adverse influence of the device substrate 10 on the device (such as elution of an impurity like an alkaline component or a roughened substrate surface). A plurality of electron emission devices S are formed on the ohmic electrodes 11, adjoining thin-film metal electrodes 15 are electrically connected, and a plurality of bus electrodes 16 are formed on parts of the thin-film metal electrodes 15, extending in parallel to one another and perpendicular to the ohmic electrodes 11. Each electron emission device S comprises the electron supply layer 12, the insulator layer 13 and the thin-film metal electrode 15 which are formed in order on the associated ohmic electrode 11. The thin-film metal electrodes 15 face the vacuum space 4. A second insulator layer 17 with openings is formed to separate the surfaces of the thin-film metal electrodes 15 into a plurality of electron emission regions. This second insulator layer 17 covers the bus electrodes 16 to prevent unnecessary short-circuiting.

The material for the ohmic electrodes 11 is Au, Pt, Al, W or the like which is generally used for the wires of an IC, and has a uniform thickness for supplying substantially the same current to the individual devices.

While silicon (Si) is one material for the electron supply layer 12, it is not restrictive for the electron supply layer of this invention and other semiconductors or metals of any of amorphous, polycrystal and monocrystal can be used as well.

From the principle of electron emission, it is better that the material for the thin-film metal electrode 15 has a smaller work function $\phi$ and is thinner. To increase the electron emission efficiency, the material for the thin-film metal electrode 15 should be a metal of the group I or group II in the periodic table; for example, Cs, Rb, Li, Sr, Mg, Ba, Ca and the like are effective and alloys of those elements may be used as well. To make the thin-film metal electrode 15 very thin, the material for the thin-film metal electrode 15 should be a chemically stable metal with a high conductivity; for example, single substances of Au, Pt, Lu, Ag and Cu or alloys thereof are desirable. It is effective to coat or dope a metal with a small work function as described above on or in those metals.

The material for the bus electrodes 16 can be Au, Pt, Al or the like which is generally used for the wires of an IC, and should have a thickness enough to supply substantially the same potential to the individual devices, adequately of 0.1 to 50 $\mu$m.

A simple matrix system or an active matrix system may be employed as the driving system for the display of this invention.

The electron emission device of this invention can be adapted to a light-emitting source for a pixel bulb, an electron emission source for an electron microscope and a fast device like a vacuum microelectronics device, and can serve as a planar or spot-like electron emission diode, a light-emitting diode or a laser diode which emits electromagnetic waves of infrared rays, visible light or ultraviolet rays.

What is claimed is:

1. An electron emission device comprising:

a substrate;

an ohmic electrode formed on said substrate;

an electron supply layer of semiconductor formed on said ohmic electrode;

an insulator layer formed on said electron supply layer; and a thin-film metal electrode formed on said insulator layer, said electron emission device emitting electrons when an electric field is applied between said electron supply layer and said thin-film metal electrode, wherein said insulator layer is a dielectric layer having a thickness of 50 nanometers or more, and formed by a vacuum evaporation process with a layer forming rate of 0.5 to 100 nanometers/minute.

2. An electron emission display comprising:

first and second substrates facing each other with a vacuum space in between;

a plurality of electron emission devices provided on said first substrate;

a collector electrode provided in said second substrate; and a fluorescent layer formed on said collector electrode, wherein each of said electron emission devices comprises an ohmic electrode on said first substrate an electron supply layer of semiconductor formed on said ohmic electrode, an insulator layer formed on said electron supply layer, and a thin-film metal electrode formed on said insulator layer, and said insulator layer is a dielectric layer having a thickness of 50 nanometers or more, and formed by a vacuum evaporation process with a layer forming rate of 0.5 to 100 nanometers/ minute.

* * * * *